US012726115B2

(12) United States Patent
Song

(10) Patent No.: US 12,726,115 B2
(45) Date of Patent: Sep. 1, 2026

(54) VOLTAGE CONVERSION UNIT, INVERTER, AND PHOTOVOLTAIC POWER GENERATION SYSTEM

(71) Applicant: Huawei Digital Power Technologies Co., Ltd., Shenzhen (CN)

(72) Inventor: Zhengang Song, Xi'an (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 207 days.

(21) Appl. No.: 18/810,063

(22) Filed: Aug. 20, 2024

(65) Prior Publication Data

US 2024/0413745 A1 Dec. 12, 2024

Related U.S. Application Data

(63) Continuation of application No. PCT/CN2022/118503, filed on Sep. 13, 2022.

(30) Foreign Application Priority Data

Feb. 21, 2022 (CN) ......................... 202210158964.3

(51) Int. Cl.

| | |
|---|---|
| ***H02M 7/48*** | (2007.01) |
| ***H02J 3/38*** | (2006.01) |
| ***H02M 1/44*** | (2007.01) |
| ***H02M 7/483*** | (2007.01) |
| *H02J 101/24* | (2026.01) |

(52) U.S. Cl.

CPC ............... *H02M 1/44* (2013.01); *H02J 3/381* (2013.01); *H02M 7/4807* (2013.01); *H02M 7/4833* (2021.05); *H02J 2101/24* (2026.01)

(58) Field of Classification Search

CPC ......... H02M 3/33538; H02M 3/33546; H02M 3/33515; H02M 3/33576; H02M 3/33553; H02M 3/33507; H02M 3/33592; H02M 3/33523; H02M 3/3353; H02M 3/33569

See application file for complete search history.

(56) References Cited

U.S. PATENT DOCUMENTS

| | | | | |
|---|---|---|---|---|
| 11,101,661 | B2 | 8/2021 | Yu et al. | |
| 2019/0190272 | A1* | 6/2019 | Park | H02J 3/381 |

FOREIGN PATENT DOCUMENTS

| | | | |
|---|---|---|---|
| CN | 203166494 | U | 8/2013 |
| CN | 108063595 | A | 5/2018 |

(Continued)

*Primary Examiner* — Bryan R Perez

(74) *Attorney, Agent, or Firm* — Conley Rose, P.C.

(57) ABSTRACT

A voltage converter includes a transformer, a primary-side circuit, and a secondary-side circuit. The primary-side circuit includes a switching transistor. The secondary-side circuit includes a first circuit loop and a second circuit loop. The first circuit loop includes a secondary-side winding of the transformer, a first switch unit, and a first energy storage unit. The second circuit loop includes a secondary-side winding of the transformer, the first energy storage unit, a second switch unit, and a second energy storage unit. When the switching transistor is turned on, the first switch unit is turned on and the second switch unit is not turned on; and when the switching transistor is turned off, the second switch unit is turned on and the first switch unit is not turned on.

20 Claims, 4 Drawing Sheets

(56) References Cited

FOREIGN PATENT DOCUMENTS

| | | | |
|---|---|---|---|
| CN | 207638614 | U | 7/2018 |
| CN | 207782746 | U | 8/2018 |
| CN | 109067204 | A | 12/2018 |
| CN | 208862762 | U | 5/2019 |
| CN | 112421981 | A | 2/2021 |
| CN | 114499157 | A | 5/2022 |

* cited by examiner

VOLTAGE CONVERSION UNIT, INVERTER, AND PHOTOVOLTAIC POWER GENERATION SYSTEM

CROSS-REFERENCE TO RELATED APPLICATIONS

This is a continuation of International Patent Application No. PCT/CN2022/118503 filed on Sep. 13, 2022, which claims priority to Chinese Patent Application No. 202210158964.3 filed on Feb. 21, 2022. The disclosures of the aforementioned applications are hereby incorporated by reference in their entireties.

TECHNICAL FIELD

This application relates to the field of photovoltaic power generation technologies, and in particular, to a voltage conversion unit, an inverter, and a photovoltaic power generation system.

BACKGROUND

As shown in FIG. 1, a photovoltaic power generation system includes a photovoltaic module 101 and an inverter circuit 102. A positive electrode (PV+) and a negative electrode (PV−) of the photovoltaic module 101 are connected to an electrical signal input port of the inverter circuit 102. An electrical signal output port (including a neutral wire port L and a live wire port N) of the inverter circuit 102 is connected to an alternating current power grid.

The photovoltaic module 101 generates a direct current voltage signal under illumination and outputs the direct current voltage signal to the inverter circuit 102. Then, the inverter circuit 102 converts the direct current voltage signal into an alternating current voltage signal and inputs the alternating current voltage signal to the alternating current power grid. A state in which the photovoltaic module 101 generates the direct current voltage signal under illumination may be referred to as a working state.

Generally, when the photovoltaic module 101 is in the working state, a negative voltage is generated between the negative electrode (PV−) of the photovoltaic module 101 and a ground metal frame of the photovoltaic module 101. The negative voltage between the negative electrode (PV−) of the photovoltaic module 101 and the ground metal frame causes a decrease in an output power of the entire photovoltaic power generation system. This phenomenon is usually referred to as potential induced degradation (PID) effect.

Therefore, how to repair the PID effect to slow down the decrease in the output power of the entire photovoltaic power generation system becomes a technical problem to be urgently resolved.

SUMMARY

This application provides a voltage conversion unit, an inverter, and a photovoltaic power generation system, to slow down a decrease in an output power of the entire photovoltaic power generation system, and further reduce a number of turns of a secondary-side winding required by a transformer in the inverter, thereby reducing the problems of a large size, high costs, and a poor electromagnetic interference (EMI) characteristic of the transformer.

According to a first aspect, this application provides a repair apparatus for PID effect of a photovoltaic module. The repair apparatus includes a transformer, a primary-side circuit, and a secondary-side circuit. The primary-side circuit includes a switching transistor. The secondary-side circuit includes a first circuit loop. The first circuit loop includes a secondary-side winding of the transformer, a first switch unit, and a first energy storage unit. The secondary-side circuit further includes a second circuit loop. The second circuit loop includes a secondary-side winding of the transformer, the first energy storage unit, a second switch unit, and a second energy storage unit. A positive electrode of the second energy storage unit is configured to be connected to a negative electrode of a photovoltaic module in a photovoltaic power generation system. A negative electrode of the second energy storage unit is configured to be connected to the ground. When the switching transistor of the repair apparatus is turned on, the first switch unit is turned on and the second switch unit is not turned on. When the switching transistor of the repair apparatus is turned off, the second switch unit is turned on and the first switch unit is not turned on.

In this embodiment, when the switching transistor in the primary-side circuit of the repair apparatus is turned on, the first switch unit is turned on and the second switch unit is not turned on. Therefore, when the switching transistor in the primary-side circuit of the repair apparatus is turned on, the first energy storage unit can be charged. In addition, when the switching transistor in the primary-side circuit is turned off, the second switch unit is turned on and the first switch unit is not turned on. Therefore, when the switching transistor in the primary-side circuit of the repair apparatus is turned off, the second energy storage unit can be charged.

In this embodiment, the positive electrode of the second energy storage unit is configured to be connected to the negative electrode of the photovoltaic module in the photovoltaic power generation system, and the negative electrode of the second energy storage unit is configured to be connected to the ground. Therefore, a value of a repair voltage of the repair apparatus for repairing PID effect of the photovoltaic module is equal to a sum of a voltage in the first energy storage unit when the switching transistor in the primary-side circuit is turned on and a voltage in the secondary-side winding when the switching transistor in the primary-side circuit is turned off. In this case, if a to-be-output voltage in the second energy storage unit is fixed, a part of the voltage may be provided by the first energy storage unit. Therefore, compared with a technology in which a voltage in a second energy storage unit is entirely provided by a voltage in a secondary-side winding, the voltage in the secondary-side winding when the switching transistor in the primary-side circuit is turned off may be reduced. Further, the voltage in the secondary-side winding is generally related to a number of turns of the secondary-side winding. Therefore, generally a higher required voltage in the secondary-side winding corresponds to a larger number of turns of the secondary-side winding. Therefore, in this embodiment, because the voltage in the secondary-side winding when the switching transistor in the primary-side circuit is turned off can be reduced, the number of turns of the secondary-side winding can be reduced, thereby reducing the problems of a large size and high costs of the transformer. Further, because the number of turns of the secondary-side winding is reduced, the problem of a poor EMI characteristic of the transformer is also reduced.

With reference to the first aspect, in a possible implementation, the first energy storage unit includes at least one first capacitor.

With reference to the first aspect, in a possible implementation, the second energy storage unit includes at least one second capacitor.

With reference to the first aspect, in a possible implementation, the first switch unit is a first diode, and the second switch unit is a second diode.

With reference to the first aspect, in a possible implementation, a negative electrode of the first diode is connected to a positive electrode of the second diode.

With reference to the first aspect, in a possible implementation, the first circuit loop further includes at least one current-limiting element, and the at least one current-limiting element is connected in series to the first diode and the first energy storage unit.

With reference to the first aspect, in a possible implementation, the current-limiting element includes any one of the following: a resistor, an inductor, and a thermistor.

According to a second aspect, this application provides an inverter, including the repair apparatus according to any one of the first aspect or the possible implementations of the first aspect.

According to a third aspect, this application provides a photovoltaic power generation system, including the inverter according to the second aspect.

According to a fourth aspect, this application provides a voltage conversion unit. The voltage conversion unit includes a transformer, a primary-side circuit, and a secondary-side circuit. The primary-side circuit includes a switching transistor. The secondary-side circuit includes a first circuit loop. The first circuit loop includes a secondary-side winding of the transformer, a first switch unit, and a first energy storage unit. The secondary-side circuit further includes a second circuit loop. The second circuit loop includes a secondary-side winding of the transformer, the first energy storage unit, a second switch unit, and a second energy storage unit. The secondary-side circuit further includes a first output port and a second output port. The first output port is connected to a first port of the second energy storage unit. The second output port is connected to a second port of the second energy storage unit. When the switching transistor is turned on, the first switch unit is turned on and the second switch unit is not turned on. When the switching transistor is turned off, the second switch unit is turned on and the first switch unit is not turned on.

In this embodiment, when the switching transistor in the primary-side circuit is turned on, the first switch unit is turned on and the second switch unit is not turned on. Therefore, when the switching transistor in the primary-side circuit is turned on, the first energy storage unit can be charged. In addition, when the switching transistor in the primary-side circuit is turned off, the second switch unit is turned on and the first switch unit is not turned on. Therefore, when the switching transistor in the primary-side circuit is turned off, the second energy storage unit can be charged.

It may be understood that, if a to-be-output voltage in the second energy storage unit is fixed, a part of the voltage may be provided by the first energy storage unit. Therefore, compared with a technology in which a voltage in a second energy storage unit is entirely provided by a voltage in a secondary-side winding, the voltage in the secondary-side winding when the switching transistor in the primary-side circuit is turned off may be reduced. Further, the voltage in the secondary-side winding is generally related to a number of turns of the secondary-side winding. Therefore, generally a higher required voltage in the secondary-side winding corresponds to a larger number of turns of the secondary-side winding. Therefore, in this embodiment, the number of turns of the secondary-side winding can be reduced, thereby reducing the problems of a large size and high costs of the transformer. Further, the problem of a poor EMI characteristic of the transformer is reduced.

With reference to the fourth aspect, in a possible implementation, the first energy storage unit includes at least one first capacitor.

In this implementation, when the first switch unit is turned on, electric energy may be stored by using the at least one capacitor.

With reference to the fourth aspect, in a possible implementation, the second energy storage unit includes at least one second capacitor.

In this implementation, when the second switch unit is turned on, electric energy may be stored by using the at least one capacitor.

With reference to the fourth aspect, in a possible implementation, the first switch unit is a first diode, and the second switch unit is a second diode.

With reference to the fourth aspect, in a possible implementation, a negative electrode of the first diode is connected to a positive electrode of the second diode.

With reference to the fourth aspect, in a possible implementation, the first circuit loop further includes at least one current-limiting element, and the at least one current-limiting element is connected in series to the first diode and the first energy storage unit. For example, the current-limiting element includes any one of the following: a resistor, an inductor, and a thermistor.

In this implementation, a current in the first circuit loop may be limited by using the current-limiting element.

According to a fifth aspect, this application provides an inverter, including the voltage conversion unit according to any one of the first aspect or the implementations of the first aspect.

With reference to the fifth aspect, in a possible implementation, the inverter is further configured to repair PID generated by a photovoltaic module.

With reference to the fifth aspect, in a possible implementation, a first output port is configured to be connected to a negative electrode of the photovoltaic module, and a second output port is configured to be connected to the ground.

In this implementation, because the first output port can be connected to the negative electrode of the photovoltaic module, a voltage to ground of the negative electrode of the photovoltaic module may be raised to a voltage of the first output port, to repair PID effect generated by the photovoltaic module.

According to a sixth aspect, this application provides a photovoltaic power generation system, including the inverter according to any one of the fifth aspect or the possible implementations of the fifth aspect.

DESCRIPTION OF EMBODIMENTS

A photovoltaic power generation technology is a low carbon, environmental protection, green energy technology, and is being widely used. Generally, the photovoltaic power generation technology may be implemented by using a photovoltaic power generation system.

Figure 1:
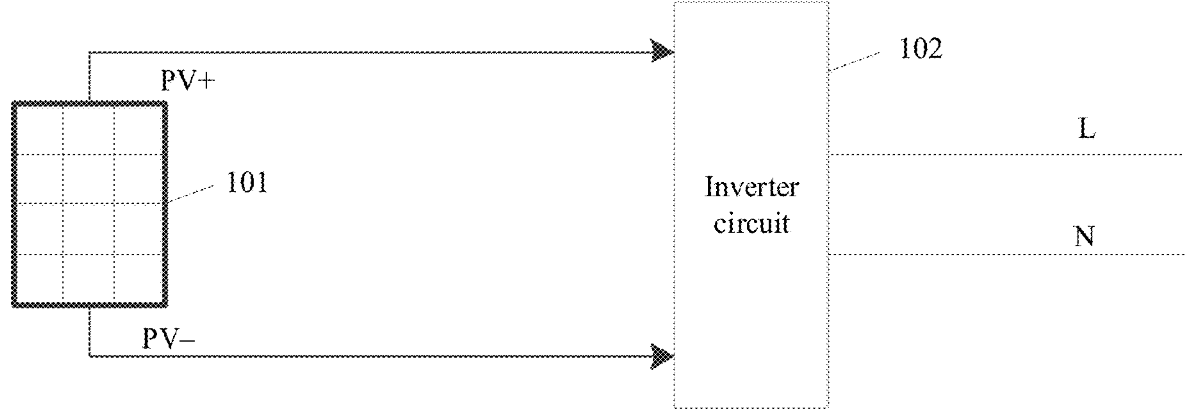
FIG. 1 is a schematic diagram of a structure of a photovoltaic power generation system according to an embodiment of this application.

FIG. 1 is a schematic diagram of a structure of a photovoltaic power generation system according to an embodiment of this application. As shown in FIG. 1, the photovoltaic power generation system includes a photovoltaic module 101 and an inverter circuit 102. A positive electrode (PV+) and a negative electrode (PV−) of the photovoltaic module 101 are connected to an electrical signal input port of the inverter circuit 102. An electrical signal output port (including a neutral wire port L and a live wire port N) of the inverter circuit 102 is connected to an alternating current power grid.

It should be noted herein that FIG. 1 merely shows one photovoltaic module 101 as an example. In an actual scenario, the inverter circuit 102 may be further simultaneously connected to a plurality of photovoltaic modules 101. This is not limited in this embodiment of this application.

It is further noted herein that a specific form of the inverter circuit is not limited in this application. For example, the inverter circuit may be a centralized inverter or a string inverter. The centralized inverter includes a combiner module, an inverter, and a transformer. The string inverter includes an inverter and a transformer. The combiner module mainly functions to combine output currents of a plurality of photovoltaic modules, and then send the combined currents to the inverter. Certainly, the inverters of the foregoing two structures are merely examples. The inverter circuit in this embodiment of this application may alternatively be implemented by using an inverter of another structure, and this is not limited in this application. In addition, in addition to the photovoltaic module and the inverter circuit, the photovoltaic power generation system may further include another circuit structure, for example, a maximum power point tracking (MPPT) circuit.

For the photovoltaic power generation system shown in FIG. 1, solar light is irradiated on the photovoltaic module 101, and the photovoltaic module 101 converts the solar light into a direct current voltage signal and outputs the direct current voltage signal to the inverter circuit 102 through the positive electrode (PV+) and the negative electrode (PV−). Then, the inverter circuit 102 converts the direct current voltage signal into an alternating current voltage signal and inputs the alternating current voltage signal to the alternating current power grid. A state in which the photovoltaic module 101 generates the direct current voltage signal under illumination may be referred to as a working state.

Generally, when the photovoltaic module 101 is in the working state, a negative voltage is generated between the negative electrode (PV−) of the photovoltaic module 101 and a ground metal frame of the photovoltaic module 101. The negative voltage between the negative electrode (PV−) of the photovoltaic module and the ground metal frame causes a decrease in an output power of the entire photovoltaic power generation system. Specifically, when the photovoltaic module 101 works in the daytime, there is a negative voltage to ground in the negative electrode (PV−) of the photovoltaic module. As a result, an electric potential difference of hundreds of volts or even thousands of volts is generated between the negative electrode (PV−) of the photovoltaic module and the metal frame. Under effect of the electric potential difference, alkali metal ions (for example, sodium ions) in packaging glass (tempered glass) migrate to a battery string in the photovoltaic module. When the alkali metal ions enter the battery string (for example, enter a negative electrode of the battery string), continuous degradation of power generation performance of the photovoltaic module occurs, causing a great decrease in an output power of the photovoltaic module.

In an example, when the photovoltaic module works, a voltage of the negative electrode (PV−) of the photovoltaic module is −300 volts (V). In this case, the voltage of −300 V exists between the negative electrode (PV−) of the photovoltaic module and the ground metal frame. Because of the voltage of −300 V, continuous degradation of power generation performance of the photovoltaic module occurs, causing a great decrease in an output power of the photovoltaic module. This phenomenon is usually referred to as PID effect.

Therefore, how to repair the PID effect to slow down the decrease in the output power of the entire photovoltaic power generation system becomes a technical problem to be urgently resolved.

Figure 2:
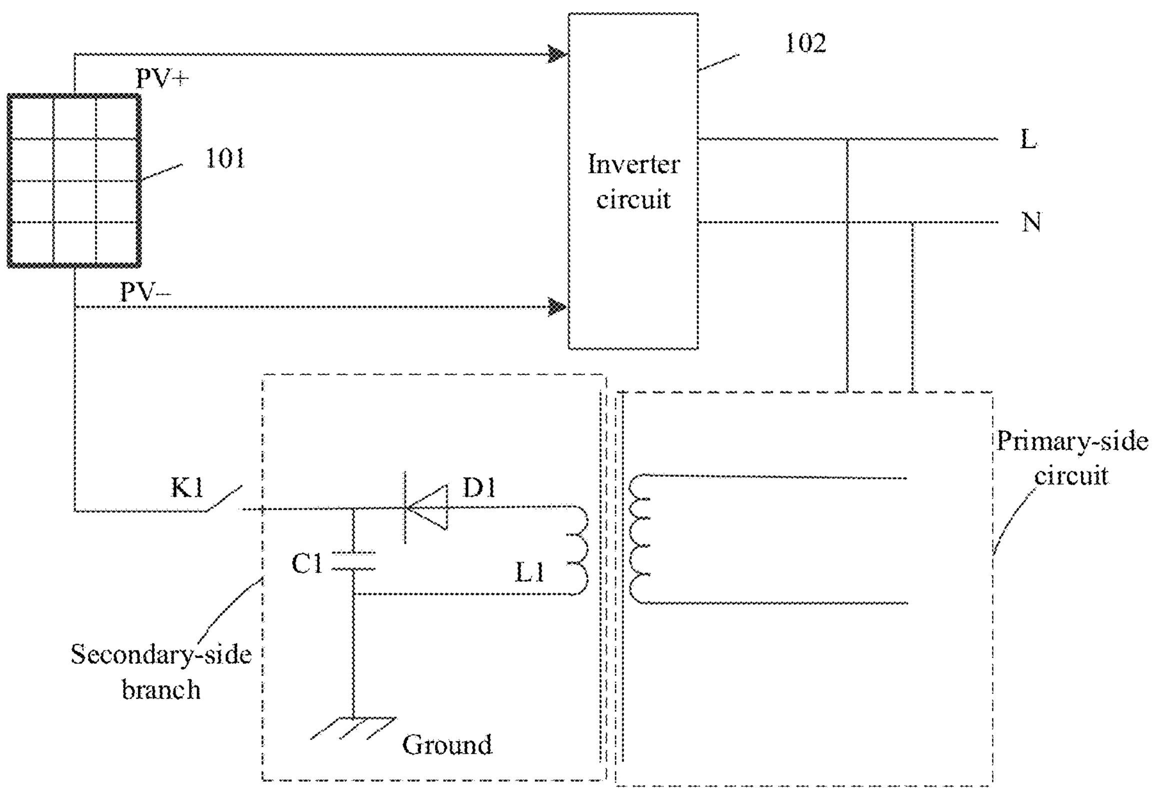
FIG. 2 is a schematic diagram of a structure of a PID repair circuit in another technology according to this application.

Currently, a technology provides a repair method for PID. FIG. 2 is a schematic diagram of a PID repair circuit in another technology. As shown in FIG. 2, a voltage conversion unit is added to an inverter of a photovoltaic power generation system to generate a direct current voltage source. Then, the direct current voltage source is applied between a negative electrode (PV−) of a photovoltaic module and the ground. A direction of the generated direct current voltage source is opposite to a direction of a direct current voltage between the negative electrode PV− of the photovoltaic module working in the daytime and the ground. This implements PID repair effect.

As shown in FIG. 2, the voltage conversion unit includes two parts: a primary-side circuit and a secondary-side branch. An input of the primary-side circuit is a phase voltage or a line voltage of the mains supply. The primary-side circuit provides energy for the secondary-side branch by using a control switch. The secondary-side branch includes a winding L1, a diode D1, and a capacitor C1. The winding L1 is configured to provide a direct current voltage source required by the secondary-side branch. The diode D1 and the capacitor C1 are connected in series. One end of the capacitor C1 is connected to the ground, and the other end of the capacitor C1 is connected to the negative electrode (PV−) of the photovoltaic module through a switch K1. During specific implementation, generally when the control switch of the primary-side circuit controls the primary-side circuit to be turned on, the primary-side circuit stores energy on an iron core. Then, when the control switch of the primary-side circuit controls the primary-side circuit to be turned off, the energy stored on the iron core is released to provide a direct current voltage source for the secondary-side branch. The diode D1 is turned on, and a current flow of the secondary-side branch passes through the diode D1 and the capacitor C1. In this case, one end of the capacitor C1 connected to the diode D1 is a positive electrode (a corresponding voltage is a positive voltage) of the capacitor C1. In this case, when the switch K1 is turned on, a value of a voltage to ground of the negative electrode (PV−) of the photovoltaic module is equal to a voltage value of the capacitor C1. Further, a positive voltage exists between the negative electrode (PV−) and the ground metal frame, so that the voltage to ground of the negative electrode (PV−) of the photovoltaic module is raised to the positive voltage.

In addition, it may be understood that, to implement repair effect, the voltage value of the capacitor C1 needs to be greater than or equal to an absolute value of a negative voltage between the negative electrode (PV−) of the photovoltaic module working in the daytime and the ground metal frame.

However, the negative voltage between the negative electrode (PV−) of the photovoltaic module working in the daytime and the ground metal frame is high. In this case, the voltage value of the capacitor C1 needs to be high (that is, an anti-PID voltage is high), for example, greater than 300 V. Consequently, there are a large number of turns of the winding L1, causing the problem of a large size and high costs of a transformer. In addition, because there are a large number of turns of the winding L1, an electromagnetic interference (EMI) characteristic of the transformer is poor.

In view of this, embodiments of this application provide a voltage conversion unit, an inverter, and a photovoltaic power generation system, to implement PID repair effect, and further reduce a number of turns of the winding L1, thereby reducing the problems of a large size and high costs of the transformer. Further, the problem of a poor EMI characteristic of the transformer is reduced.

It should be noted herein that, in this embodiment of this application, when PID effect generated by the photovoltaic module is repaired, there may be one or more photovoltaic modules for repair.

Figure 3:
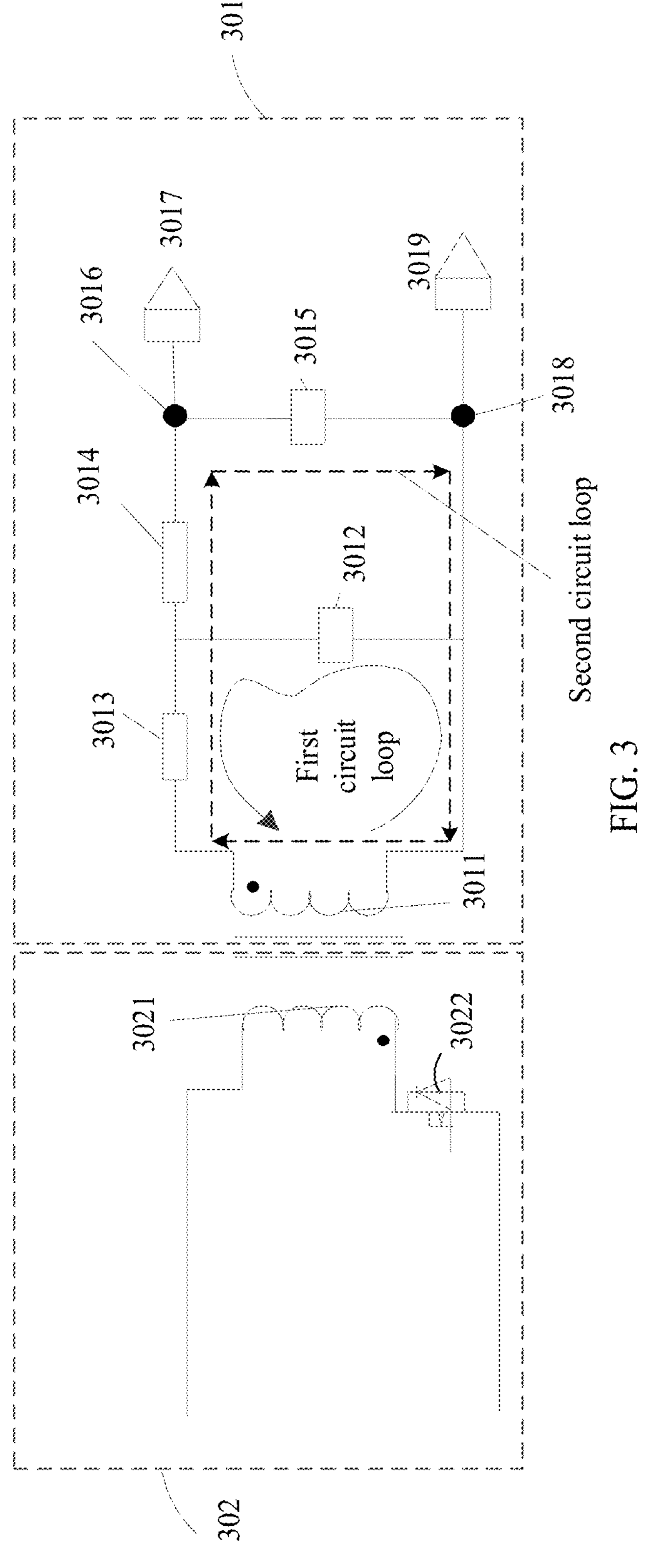
FIG. 3 is a schematic diagram of a structure of a circuit of a voltage conversion unit according to an embodiment of this application.

FIG. 3 is a schematic diagram of a structure of a circuit of a voltage conversion unit according to an embodiment of this application. It should be noted herein that the circuit of the voltage conversion unit in this embodiment may be included in an inverter. In addition, the inverter may further include more other circuit structures, for example, an inverter circuit. This is not limited in this embodiment.

As shown in FIG. 3, the voltage conversion unit includes a secondary-side circuit 301, a primary-side circuit 302, and a transformer. The transformer includes a winding 3011 in the secondary-side circuit 301, a winding 3021 in the primary-side circuit 302, and an iron core. It should be noted herein that, in this embodiment, the winding 3011 is also referred to as the secondary-side winding 3011.

Specifically, the primary-side circuit includes a switching transistor 3022. The secondary-side circuit 301 includes a first circuit loop. The first circuit loop includes the secondary-side winding 3011, a first switch unit 3012, and a first energy storage unit 3013.

The secondary-side circuit 301 further includes a second circuit loop. The second circuit loop includes the secondary-side winding 3011, the first energy storage unit 3013, a second switch unit 3014, and a second energy storage unit 3015. The secondary-side circuit 301 further includes a first output port 3017 and a second output port 3019. The first output port 3017 is connected to a first port 3016 of the second energy storage unit. The second output port 3019 is connected to a second port 3018 of the second energy storage unit. When the switching transistor 3022 is turned on, the first switch unit 3012 is turned on and the second switch unit 3014 is not turned on. When the switching transistor 3022 is turned off, the second switch unit 3014 is turned on and the first switch unit 3012 is not turned on.

In this embodiment, the secondary-side winding 3011 is the winding in the secondary-side circuit. Generally, the secondary-side winding 3011 and the winding 3021 in the primary-side circuit 302 are located on the same iron core. Specifically, the primary-side circuit 302 may be controlled by using the primary-side switching transistor, so that a voltage is applied to the winding 3021 to generate an alternating flux in the iron core. Further, under effect of the flux, the secondary-side winding 3011 is enabled to induce an electromotive force, so that the secondary-side circuit can work.

It should be noted herein that a specific circuit structure of the primary-side circuit 302 is not limited in this embodiment of this application. For example, the primary-side circuit 302 may generally include a circuit structure connected to the mains supply to obtain an alternating current, and a circuit structure for obtaining a rectification voltage by using a rectifier.

It should be noted herein that a specific material of the secondary-side winding 3011 is not limited in this embodiment. For example, a double-silk covered insulated flat wire or an enameled round wire may be used for winding. For a concept related to the winding, refer to descriptions in another technology. Details are not described herein again.

In this embodiment, the secondary-side circuit may be considered to be formed by two parts: the first circuit loop including the secondary-side winding 3011, the first switch unit 3012, and the first energy storage unit 3013, and the second circuit loop including the secondary-side winding 3011, the first energy storage unit 3013, the second switch unit 3014, and the second energy storage unit 3015.

It should be noted that a primary winding in the primary-side circuit and the winding (also referred to as a secondary winding) in the secondary-side circuit in the transformer are usually marked with dotted terminals, so that a direction of the induced electromotive force of the secondary winding in the secondary-side circuit can be determined.

In an example, as shown in FIG. 3, a black dot (located at one end of the winding 3021) in the primary-side circuit 302 and a black dot (located at one end of the secondary-side winding 3011) in the secondary-side circuit represent the dotted terminals. In this case, if the black dot in the primary-side circuit represents a negative electrode, the black dot in the secondary-side winding 3011 represents a negative electrode. Correspondingly, the other end corresponding to the end at which the black dot of the winding 3021 is located represents a positive electrode. In this case, if whether the circuit loop is conductive is not considered, a current in the first circuit loop may start from the positive electrode of the secondary-side winding 3011, pass through the first switch unit 3012 and the first energy storage unit 3013, and then return to the negative electrode of the secondary-side winding 3011. However, a current in the second circuit loop may start from the positive electrode of the secondary-side winding 3011, pass through the second energy storage unit 3015, then pass through the second switch unit 3014 and the first energy storage unit 3013, and then return to the negative electrode of the secondary-side winding 3011.

In another example, FIG. 3 is still used as an example. In this case, if the black dot in the primary-side circuit represents a positive electrode, the black dot in the secondary-side winding 3011 represents a positive electrode. Correspondingly, the other end corresponding to the end at which the black dot of the secondary-side winding 3011 is located represents a negative electrode. In this case, if whether the circuit loop is conductive is not considered, a current in the first circuit loop may start from the positive electrode of the secondary-side winding 3011, pass through the first energy storage unit 3013, then pass through the first switch unit 3012, and then return to the negative electrode of the secondary-side winding 3011. However, a current in the second circuit loop may start from the positive electrode of the secondary-side winding 3011, pass through the first energy storage unit 3013, then pass through the second switch unit 3014 and the second energy storage unit 3015, and then return to the negative electrode of the secondary-side winding 3011.

For a detailed concept of the dotted terminals, refer to descriptions in another technology. Details are not described herein again.

In this embodiment, the first energy storage unit 3013 or the second energy storage unit 3015 is an element configured to store electric energy, for example, may be a capacitor.

In this embodiment, the first switch unit 3012 is a switch that can control the first circuit loop to be conductive or not to be conductive. For example, the first switch unit 3012 is a diode, or another element having a same function as the diode. This is not limited in this embodiment of this application.

In this embodiment, the second switch unit 3014 is a switch that can control the second circuit loop to be conductive or not to be conductive. For example, the second switch unit 3014 is a diode, or another element having a same function as the diode. This is not limited in this embodiment of this application.

In this embodiment, when the switching transistor 3022 in the primary-side circuit is turned on, the first switch unit 3012 is turned on and the second switch unit 3014 is not turned on. When the switching transistor 3022 in the primary-side circuit is turned off, the second switch unit 3014 is turned on and the first switch unit 3012 is not turned on.

It may be understood that, when the first switch unit 3012 is turned on and the second switch unit 3014 is not turned on, it indicates that the first circuit loop is conductive. Further, because the first circuit loop is conductive, the first energy storage unit 3013 is charged, so that the first energy storage unit 3013 can store electric energy. It may be understood that, because the second switch unit 3014 is not turned on in this case, a voltage between the first output port 3017 and the second output port 3019 may be maintained by using the second energy storage unit 3015.

It may be further understood that, when the second switch unit 3014 is turned on and the first switch unit 3012 is not turned on, it indicates that the second circuit loop is conductive. Further, because the second circuit loop is conductive, the second energy storage unit 3015 is charged, so that the second energy storage unit 3015 can store electric energy. In addition, it may be understood that, in this embodiment, when the second circuit loop is conductive so that the second energy storage unit 3015 can be charged, a voltage in the second energy storage unit 3015 is equal to a sum of a voltage in the secondary-side winding 3011 and a voltage in the first energy storage unit 3013.

It may be understood that, in another technology, the voltage in the second energy storage unit 3015 is entirely provided by the voltage in the secondary-side winding 3011. However, in this embodiment, when the second switch unit is not turned on, the first switch unit is turned on (that is, the first energy storage unit 3013 can be charged). Therefore, in this case, when the second switch unit is turned on so that the second energy storage unit 3015 can be charged, if a to-be-output voltage in the second energy storage unit 3015 is fixed, a part of the voltage may be provided by the first energy storage unit 3013. Therefore, the voltage in the secondary-side winding 3011 when the primary-side switching transistor is turned off may be reduced. Further, the voltage in the secondary-side winding 3011 is generally related to a number of turns of the secondary-side winding 3011. Therefore, generally a higher required voltage in the secondary-side winding 3011 corresponds to a larger number of turns of the secondary-side winding 3011. Therefore, in this embodiment, because the voltage in the secondary-side winding 3011 when the primary-side switching transistor is turned off can be reduced, the number of turns of the secondary-side winding 3011 can be reduced, thereby reducing the problems of a large size and high costs of the transformer. Further, the problem of a poor EMI characteristic of the transformer is reduced.

It should be noted herein that a specific circuit structure of the primary-side circuit 302 is not limited in this embodiment of this application, and may be determined based on an actual scenario.

In a possible implementation, the first energy storage unit includes at least one first capacitor. The second energy storage unit includes at least one second capacitor. The first switch unit is a first diode. The second switch unit is a second diode. A negative electrode of the first diode is connected to a positive electrode of the second diode.

Figure 4:
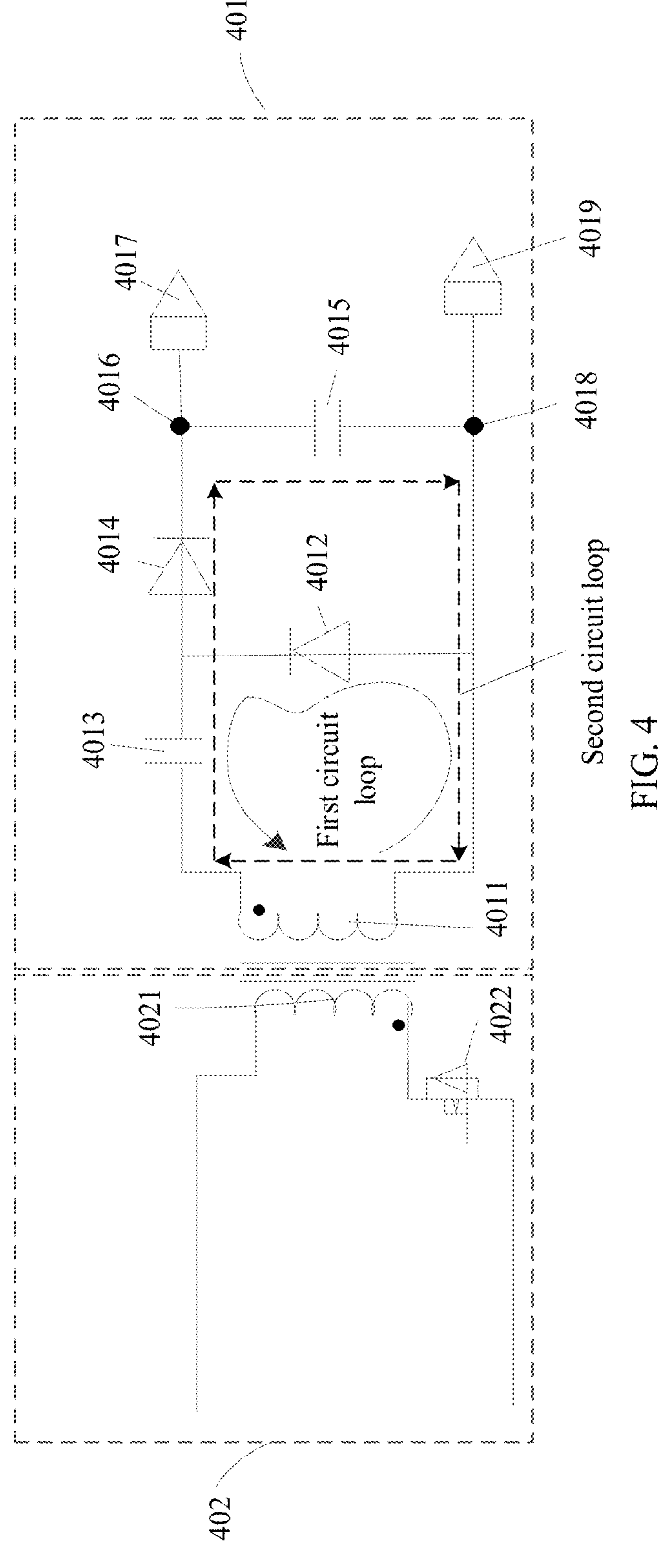
FIG. 4 is a schematic diagram of a structure of a circuit of a voltage conversion unit according to another embodiment of this application.

For example, FIG. 4 is a schematic diagram of a structure of a circuit of a voltage conversion unit according to another embodiment of this application. As shown in FIG. 4, the voltage conversion unit includes a secondary-side circuit 401, a primary-side circuit 402, and a transformer. The transformer includes a winding 4011 in the secondary-side circuit 401, a winding 4021 in the primary-side circuit 402, and an iron core. It should be noted herein that, in this embodiment, the winding 4011 is also referred to as the secondary-side winding 4011.

Specifically, the primary-side circuit includes a switching transistor 4022. The secondary-side circuit 401 includes a first circuit loop. The first circuit loop includes the secondary-side winding 4011, a first diode 4012, and a first capacitor 4013.

The secondary-side circuit 401 further includes a second circuit loop. The second circuit loop includes the secondary-side winding 4011, the first capacitor 4013, a second diode 4014, and a second capacitor 4015. The secondary-side circuit 401 further includes a first output port 4017 and a second output port 4019. The first output port 4017 is connected to a first port 4016 of the second capacitor 4015. The second output port 4019 is connected to a second port 4018 of the second capacitor 4015. When the switching transistor 4022 is turned on, the first switch unit 4012 is turned on and the second switch unit 4014 is not turned on. When the switching transistor 4022 is turned off, the second switch unit 4014 is turned on and the first switch unit 4012 is not turned on.

Compared with the embodiment shown in FIG. 3, in this embodiment, the first diode 4012 is used as the first switch unit, the second diode 4014 is used as the second switch unit, the first capacitor 4013 is used as a first energy storage unit, the second capacitor 4015 is used as a second energy storage unit, and a negative electrode of the first diode is connected to a positive electrode of the second diode.

In this embodiment, when the switching transistor 4022 in the primary-side circuit is turned on, the first diode 4012 is turned on and the second diode 4014 is not turned on. When the switching transistor 4022 in the primary-side circuit is turned off, the second diode 4014 is turned on and the first diode 4012 is not turned on.

As shown in FIG. 4, when the first diode 4012 is turned on and the second diode 4014 is not turned on, it indicates that the first circuit loop is conductive. In this case, a current in the first current loop starts from a lower end of the secondary-side winding 4011, flows through the first diode 4012, then flows through the first capacitor 4013, and finally returns to an upper part of the secondary-side winding 4011. In this way, the first capacitor 4013 is charged, so that the first energy storage unit 4013 can store electric energy. In addition, because the second diode 4014 is not turned on in this case, a voltage between the first output port 4017 and the second output port 4019 may be maintained by using the second capacitor 4015.

It may be further understood that, when the second diode 4014 is turned on and the first diode 4012 is not turned on, it indicates that the second circuit loop is conductive. In this case, a current in the second current loop starts from an upper end of the secondary-side winding 4011, flows through the first diode 4012, flows through the second diode 4014, then flows through the second capacitor 4015, and finally returns to a lower part of the secondary-side winding 4011. In this way, the second capacitor 4015 is charged.

In addition, it may be understood that, in this embodiment, when the second capacitor 4015 is charged, a voltage in the second capacitor 4015 is equal to a sum of a voltage in the secondary-side winding 4011 when the primary-side switching transistor is turned off and a voltage in the first capacitor 4013 when the primary-side switching transistor is turned on. Therefore, if a to-be-output voltage in the second capacitor 4015 is fixed, a part of the voltage may be provided by the first capacitor 4013. Therefore, the voltage in the secondary-side winding 4011 when the primary-side switching transistor is turned off may be reduced, and a number of turns of the secondary-side winding 4011 may be reduced, thereby reducing the problems of a large size and high costs of the transformer. Further, the problem of a poor EMI characteristic of the transformer is reduced.

In an optional embodiment, the first circuit loop further includes at least one current-limiting element, and the at least one current-limiting element is connected in series to the first diode and the first energy storage unit. For example, the current-limiting element includes any one of the following: a resistor, an inductor, and a thermistor.

It should be understood that a circuit conversion unit in this application may be included in an inverter. In this case, the inverter in this application may be further configured to repair PID generated by a photovoltaic module. Specifically, during PID repair, the first output port in this embodiment may be configured to be connected to a negative electrode (PV−) of the photovoltaic module, and the second output port is configured to be connected to the ground.

It should be further noted herein that, in the inverter in this application, the secondary-side circuit may further include more branches, for example, may further include some branches for other purposes (for example, power supply), for example, a main feedback branch. The main feedback branch may be considered as a branch that requires voltage output stability and high precision.

Figure 5:
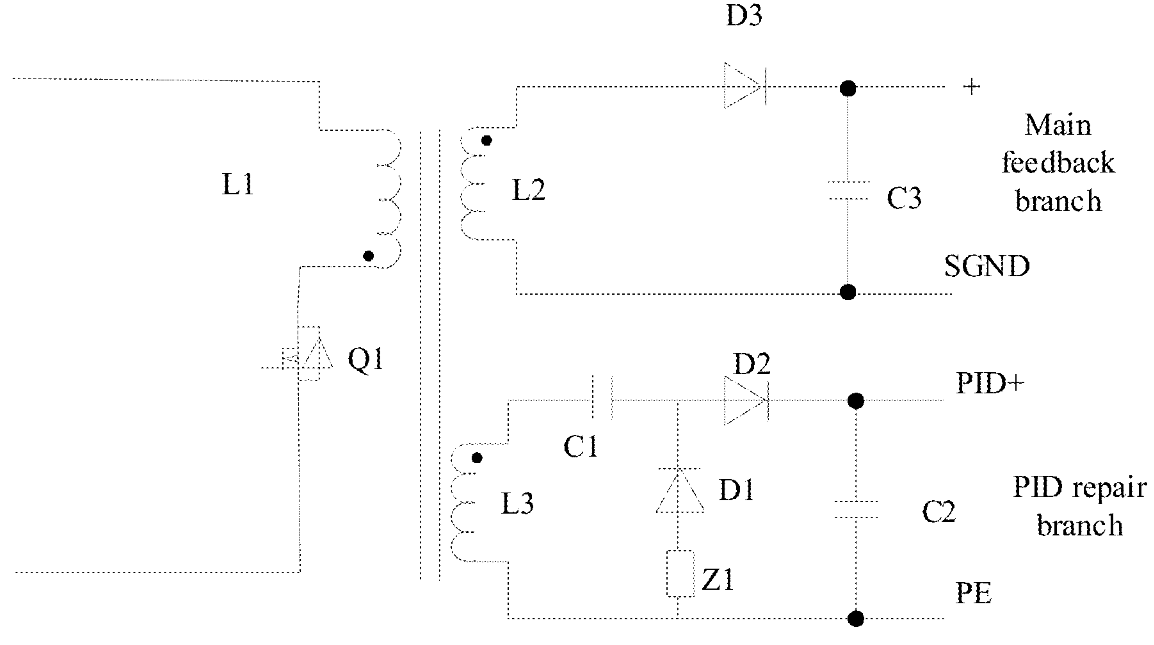
FIG. 5 is a schematic diagram of a structure of a voltage conversion unit according to still another embodiment of this application.

With reference to FIG. 5, the following specifically describes a reason why a voltage conversion unit provided in this application can reduce a number of turns of a secondary-side winding.

FIG. 5 is a schematic diagram of a structure of a voltage conversion unit according to still another embodiment of this application. In FIG. 5, a circuit on the left side represents a primary-side circuit, a circuit connected to a primary-side winding includes a switching transistor Q1, and a winding in the primary-side circuit is denoted as L1. For ease of description, the switching transistor Q1 is also referred to as the primary-side switching transistor Q1 in this embodiment. In this embodiment, a secondary-side circuit on the right side includes two branches: a main feedback branch and a PID repair branch.

A winding in the main feedback branch is denoted as L2. Specifically, the main feedback branch includes a diode D3 and a capacitor C3. In this embodiment, an output voltage of the capacitor C3 is denoted as Vout.

A winding in the PID repair branch is denoted as L3. Specifically, the PID repair branch includes a diode D1, a resistor Z1, a capacitor C1, a diode D2, and a capacitor C2. One end of the capacitor C2 outputs a positive voltage (for example, PID+ in the figure), and the other end is connected to the ground. For a connection relationship between components, refer to FIG. 5.

For the voltage conversion unit shown in FIG. 5, during specific implementation, when the primary-side switching transistor Q1 is turned on, the winding L1 in the primary-side circuit is in a state in which the upper part is a positive electrode and the lower part is a negative electrode. In this case, a transformer is in a magnetization stage, and a current continuously increases. For the main feedback branch in the secondary-side circuit, the diode D3 is reversely turned off, and there is no current in the winding L2 in the main feedback branch. For the PID repair branch, the diode D1 is forwardly turned on, a current passes through the winding L3, the resistor Z1, the diode D1, and the capacitor C1, the capacitor C1 is charged in this period, and a voltage of the capacitor C1 is in a state in which the left side is negative polarity and the right side is positive polarity. However, the diode D2 in the PID repair branch is reversely turned off. In this case, a PID output voltage is mainly maintained by using the capacitor C2.

When the primary-side switching transistor Q1 is turned off, the winding L1 in the primary-side circuit is in a state in which the upper part is a negative electrode and the lower part is a positive electrode, and a current is 0. In this case, the transformer is in a demagnetization stage. The winding L2 in the main feedback branch of the secondary-side circuit is in a state in which the upper part is a positive electrode and the lower part is a negative electrode. In this case, the diode D3 is forwardly turned on, so that the capacitor C3 in the main feedback branch is charged. The winding L3 in the PID repair branch is in a state in which the upper part is a positive electrode and the lower part is a negative electrode. In this case, the diode D1 is reversely turned off, the diode D2 is forwardly turned on, and a current in the PID repair branch passes through the winding L3, the capacitor C1, the diode D2, and the capacitor C2. It may be learned that, in this case, the PID output voltage is equal to a sum of a voltage in the winding L3 when Q1 is turned off and a voltage in the capacitor C1 when Q1 is turned on.

It is assumed that a number of turns of the primary-side winding L1 is N1, an input voltage of the primary-side circuit is Vin, a number of turns of the winding L2 in the main feedback branch is N2, the output voltage of the main feedback branch is Vout (namely, the voltage in the capacitor C3), a number of turns of the winding L3 in the PID repair branch is N3, and an output voltage of the PID repair branch is Vpid (namely, a voltage in the capacitor C2). In this case, when the primary-side switching transistor Q1 is turned on, an induced voltage corresponding to the winding L3 in the PID repair branch is Vin*N3/N1; and when the primary-side switching transistor Q1 is turned off, an induced voltage corresponding to the winding L3 in the PID repair branch is Vout*N3/N2. Therefore, Vpid=Vin*N3/N1+Vout*N3/N2 may be obtained.

It may be understood that, because an anti-PID voltage is equal to a sum of the voltage in the capacitor C1 when the primary-side switching transistor Q1 is turned on and the voltage in the winding L3 when the primary-side switching transistor Q1 is turned off, the number of turns of the winding L3 may be reduced, thereby reducing a size of the transformer and improving an EMI characteristic of the transformer.

All or some of the foregoing embodiments may be implemented using software, hardware, firmware, or any combination thereof. When software is used to implement embodiments, the foregoing embodiments may be implemented completely or partially in a form of a computer program product. The computer program product includes one or more computer instructions or computer programs. When the program instructions or the computer programs are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects and represents that three relationships may exist. For example, A and/or B may represent the following three cases: only A exists, both A and B exist, and only B exists. A and B may be singular or plural. In addition, the character "/" in this specification usually indicates an "or" relationship between the associated objects, but may also indicate an "and/or" relationship. For details, refer to the context for understanding.

In this application, at least one means one or more, and a plurality of means two or more. At least one of the following items (pieces) or a similar expression thereof refers to any combination of these items, including any combination of singular items (pieces) or plural items (pieces). For example, at least one item (piece) of a, b, and c may indicate: a, b, c, a and b, a and c, b and c, or a, b, and c, where a, b, and c may be singular or plural.

It should be understood that sequence numbers of the foregoing processes do not mean execution sequences in embodiments of this application. The execution sequences of the processes should be determined based on functions and internal logic of the processes, and should not constitute any limitation on implementation processes of the embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application, or some of the technical solutions may be implemented in a form of a software product. The software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a Universal Serial Bus (USB) flash drive, a removable hard disk, a read-only memory, a random-access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A repair apparatus comprising:

a transformer comprising a secondary-side winding;

a primary-side circuit comprising a switching transistor; and a secondary-side circuit comprising:

a first circuit loop comprising:

the secondary-side winding;

a first switch; and a first energy storage device; and a second circuit loop comprising:

the secondary-side winding;

the first energy storage device;

a second switch; and a second energy storage device comprising:

a first positive electrode configured to connect to a negative photovoltaic electrode of a photovoltaic module in a photovoltaic power generation system; and a first negative electrode configured to connect to a ground, wherein when the switching transistor is turned on, the first switch is configured to turn on and the second switch is configured to not turn on, and wherein when the switching transistor is turned off, the second switch is configured to turn on and the first switch is configured to not turn on.

2. The repair apparatus according to claim 1, wherein the first energy storage device comprises at least one first capacitor.

3. The repair apparatus according to claim 1, wherein the second energy storage device comprises at least one capacitor.

4. The repair apparatus according to claim 1, wherein the first switch is a first diode, and wherein the second switch is a second diode.

5. The repair apparatus according to claim 4, wherein the first diode comprises a second negative electrode, and wherein the second diode comprises a second positive electrode connected to the second negative electrode.

6. The repair apparatus according to claim 1, wherein the first switch is a first diode, wherein the first circuit loop further comprises at least one current-limiting element, and wherein the at least one current-limiting element is connected in series to the first diode and the first energy storage device.

7. The repair apparatus according to claim 6, wherein the current-limiting element comprises at least one of a resistor, an inductor, or a thermistor.

8. A voltage converter comprising:

a transformer comprising a secondary-side winding;

a primary-side circuit comprising a switching transistor; and a secondary-side circuit comprising:

a first circuit loop comprising:

the secondary-side winding;

a first switch; and a first energy storage device;

a second circuit loop comprising:

the secondary-side winding;

the first energy storage device;

a second switch; and a second energy storage device comprising a first port and a second port;

a first output port connected to the first port; and a second output port connected to the second port, wherein when the switching transistor is turned on, the first switch is configured to turn on and the second switch is configured to not turn on, and wherein when the switching transistor is turned off, the second switch is configured to turn on and the first switch is configured to not turn on.

9. The voltage converter according to claim 8, wherein the first energy storage device comprises at least one capacitor.

10. The voltage converter according to claim 8, wherein the second energy storage device comprises at least one capacitor.

11. The voltage converter according to claim 8, wherein the first switch is a first diode, and wherein the second switch is a second diode.

12. The voltage converter according to claim 11, wherein the first diode comprises a second negative electrode, and wherein the second diode comprises a second positive electrode connected to the second negative electrode.

13. The voltage converter according to claim 8, wherein the first switch is a first diode, wherein the first circuit loop further comprises at least one current-limiting element, and wherein the at least one current-limiting element is connected in series to the first diode and the first energy storage device.

14. The voltage converter according to claim 13, wherein the current-limiting element comprises at least one of a resistor, an inductor, or a thermistor.

15. An inverter, comprising:

an inverter circuit; and a voltage converter comprising:

a transformer comprising a secondary-side winding;

a primary-side circuit comprising a switching transistor; and a secondary-side circuit comprising:

a first circuit loop comprising:

the secondary-side winding;

a first switch; and a first energy storage device;

a second circuit loop comprising:

the secondary-side winding;

the first energy storage device;

a second switch; and a second energy storage device comprising a first port and a second port;

a first output port connected to the first port; and a second output port connected to the second port, wherein when the switching transistor is turned on, the first switch is configured to turn on and the second switch is configured to not turn on, and wherein when the switching transistor is turned off, the second switch is configured to turn on and the first switch is configured to not turn on.

16. The inverter according to claim 15, wherein the inverter is configured to repair potential-induced degradation (PID) from a photovoltaic module.

17. The inverter according to claim 16, wherein the first output port is configured to connect to a negative electrode of the photovoltaic module, and wherein the second output port is configured to connect to a ground.

18. The inverter according to claim 15, wherein the first switch is a first diode, and wherein the second switch is a second diode.

19. The inverter according to claim 18, wherein the first diode comprises a second negative electrode, and wherein the second diode comprises connected to a second positive electrode connected to the second negative electrode.

20. The inverter according to claim 15, wherein the first switch is a diode, wherein the first circuit loop further comprises at least one current-limiting element, and wherein the at least one current-limiting element is connected in series to the first diode and the first energy storage device.

* * * * *